Figure 1:
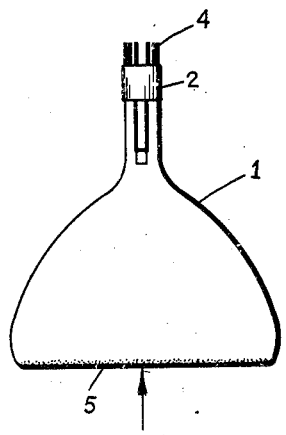

Oct. 25, 1949.    G. BURROUGHS    2,485,561
CATHODE-RAY TUBE
Filed March 29, 1946

INVENTOR.
GORDON S. BURROUGHS
BY
ATTORNEY

Patented Oct. 25, 1949

2,485,561

UNITED STATES PATENT OFFICE 2,485,561

CATHODE-RAY TUBE

Gordon Burroughs, Forest Hills, N. Y., assignor, by mesne assignments, to International Standard Electric Corporation, New York, N. Y., a corporation of Delaware Application March 29, 1946, Serial No. 657,978

2 Claims. (Cl. 250—164)

This invention relates to cathode ray tubes and more particularly to improved luminescent screens therefor.

In cathode ray tubes used heretofore, the visual effect of the cathode ray tube is obtained by having a beam of electrons impinged on a screen covered with a fluorescent material. The effect is to produce a luminescent spot on the screen which moves in accordance with the deflections impressed on the beam. In localities where extraneous light is present, the relative brightness of the luminescent spot frequently suffers because of the neutral and reflective properties of the viewing surface exposed to ambient light. This causes the spot to appear of lesser brilliance than it actually is. Another factor in determining the relative brightness of the luminescent spot may be found in the angle of light propagated through the screen toward the observer, the angle being relatively wide whereby the quantity of light actually viewed by the observer is somewhat diminished.

It is an object of the present invention to provide a cathode ray tube having a screen providing a dark back-ground for the luminescent spot due to the electron beam for greater contrast therewith.

It is a further object to provide a cathode ray tube which confines the angle of light propagated in respect to an observer.

In accordance with my invention, I provide in a cathode ray tube having a screen which, in addition to the usual fluorescent coating, is supplied with a surface-wide lens system which is constructed in such a way that the light, due to the cathode ray beam fluorescence, subtends a relatively narrow angle in respect to an observer.

In accordance with another feature of the invention, the surface toward the observer is covered with opaque black material in such a way as to permit only small parts of the surface to be left uncovered whereby the general appearance on the screen is black or a dark gray to provide a suitably dark back-ground for the electron ray spot as it is propagated through the thickness of the screen.

Figure 2:
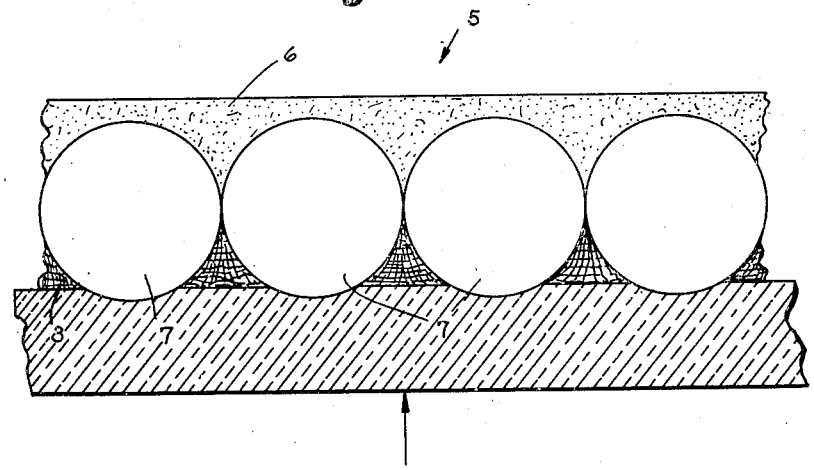

These and other objects of the present invention will become apparent and my invention will be best understood from the following description of an embodiment thereof, reference being had to the drawing, in which:

Fig. 1 is a view, in elevation, of a cathode ray tube in accordance with my invention; and Fig. 2 is a magnified cross section of the screen of the tube in Fig. 1 where the arrow indicates the direction from which an observer would view the screen.

Referring to the tube illustrated in Fig. 1, it is shown to comprise a glass envelope 1 secured to a base 2 and enclosing suitable electrodes which may be energized through pins 4. The envelope 1 is enlarged and shaped in the usual manner to provide a substantially flat viewing screen as at 5. Referring to the section of the viewing screen 5 shown in Fig. 2, a fluorescent coating is provided at 6 to which is applied a light refractory body, preferably of multi-unit structure. The units may comprise a number of small glass spheres 7 embedded, closely spaced, in the fluorescent coating. The surface toward the observer is coated with a black, opaque substance such as a paint which has been made to fill in between the glass spheres. The coating or filling has been applied to leave uncovered the forward portions of the spheres as can be seen in the drawing.

The principle of operation of this screen may be understood by an inspection of Fig. 2. The fluorescent screen is covered with a single layer of tiny glass spheres, preferably of the order of .005 inch in diameter. These tiny spheres act as lenses and serve to refract the light of the fluorescent screen so that it is directed within a fairly small angle toward the observer. Consequently the spreading of the light is minimized. An actual increase in brightness of the luminescent spot is thereby achieved. Since a large percentage of the screen area also is black because of the opaque material covering the spaces between adjacent spheres, the screen area, when viewed from the front will appear black, and the spheres which are nearly invisible will have a dark gray or black appearance. In consequence, the effective luminescent spot will appear relatively bright against a dark back-ground resulting in improved contrast even in the presence of stray outside light falling on the screen.

Should the cathode ray tube have a green fluorescence for example, green glass spheres may be used. In addition to their function as outlined above, the green spheres will function as filters and will transmit the green light with little loss. In contrast, any stray white outside light will be attenuated, thus providing an even darker back-ground for the trace.

While I have described above the principles of my invention in connection with specific apparatus, it is to be clearly understood that this description is made only by way of example and not as a limitation on the scope of my invention.

I claim:

1. A cathode ray tube comprising an envelope having a viewing screen disposed at one end thereof, said viewing screen comprising a fluorescent surface, a plurality of light refracting spheres disposed adjacent each other within said envelope and substantially adjacent said surface, each of said spheres having a diameter comparable to that of the luminescent spot produced on the screen by the electron beam, and an opaque material filling in at least part of the spaces defined by adjacent spheres leaving uncovered given sphere portions substantially directly in the line of observation.

2. A cathode ray tube comprising an envelope having a viewing screen disposed at one end thereof, said viewing screen comrising a fluorescent surface, a plurality of light refracting lenses adjacent each other within said envelope and substantially adjacent said surface, each of said lenses having dimensions comparable to that of the luminescent spot produced on the screen by the electron beam, and an opaque material filling in at least part of the spaces defined by adjacent lenses leaving uncovered given lens portions substantially directly in the line of observation.

GORDON BURROUGHS.

REFERENCES CITED

The following references are of record in the file of this patent:

UNITED STATES PATENTS

| Number | Name | Date |
|---|---|---|
| 1,942,841 | Shimizu | Jan. 9, 1934 |
| 2,090,922 | Von Ardenne | Aug. 24, 1937 |
| 2,091,152 | Malpica | Aug. 24, 1937 |
| 2,137,118 | Schleede et al. | Nov. 15, 1938 |
| 2,201,245 | Ruska et al. | May 21, 1940 |
| 2,289,978 | Malter | July 14, 1942 |
| 2,388,203 | Zindell, Jr. | Oct. 30, 1945 |